United States Patent
Kolam et al.

(10) Patent No.: US 9,253,013 B1
(45) Date of Patent: *Feb. 2, 2016

(54) EFFICIENT DELIVERY OF CONTENT BY VIRTUALIZATION OF DYNAMIC INTERACTION WITH THE DOCUMENT OBJECT MODEL

(75) Inventors: Hariharan Kolam, Palo Alto, CA (US); Brian Kennedy, Mountain View, CA (US); Rajaram Gaunker, Bangalore (IN); Raghu Batta Venkat, Palo Alto, CA (US)

(73) Assignee: Instart Logic, Inc., Palo Alto, CA (US)

( * ) Notice: Subject to any disclaimer, the term of this patent is extended or adjusted under 35 U.S.C. 154(b) by 564 days.

This patent is subject to a terminal disclaimer.

(21) Appl. No.: 13/563,554

(22) Filed: Jul. 31, 2012

(51) Int. Cl.
*G06F 15/16* (2006.01)
*H04L 29/08* (2006.01)
*H04L 29/06* (2006.01)

(52) U.S. Cl.
CPC .......... *H04L 29/08072* (2013.01); *H04L 29/06* (2013.01)

(58) Field of Classification Search
USPC ........................................................ 709/203
See application file for complete search history.

(56) References Cited

U.S. PATENT DOCUMENTS

| | | | | |
|---|---|---|---|---|
| 8,554,832 B1 * | 10/2013 | Moskovitz | ............... | G06F 9/54 370/411 |
| 2008/0052387 A1 * | 2/2008 | Heinz | ............... | H04L 41/5025 709/223 |
| 2008/0077653 A1 * | 3/2008 | Morris | ............... | G06F 17/30896 709/203 |
| 2010/0008580 A1 * | 1/2010 | Mizuno | ............... | G06K 9/2054 382/176 |

* cited by examiner

*Primary Examiner* — Emmanuel L Moise
*Assistant Examiner* — Mahran Abu Roumi
(74) *Attorney, Agent, or Firm* — Van Pelt, Yi and James LLP

(57) ABSTRACT

A method of updating a document object model (DOM) is disclosed. A request by a web browser for information to update the DOM is intercepted by intercepting an interaction with the DOM. The request is converted to a server request as part of a client-server protocol, requesting at least a portion of the information from a server. The server request is sent to the server. A first server response including at least a portion of the information from the server is received. The first server response is processed according to the client-server protocol to determine a first update to the DOM. The first update is applied to the DOM.

40 Claims, 6 Drawing Sheets

```
<html>
  <head>
    <title>Welcome</title>
  </head>
  <body>
    <h1>HelloWorld </h1>
        .
        .
        .
    <img src = "url for image"/>
    <video>
        <source src = "url for video" type = "video/ogg"  />
    </video>
    <script type = "text/javascript">
    <!--script
    *** Some javascript code is placed here ***
    -->
    </script>
  </body>
</html>
```

Script

FIG. 2

EFFICIENT DELIVERY OF CONTENT BY VIRTUALIZATION OF DYNAMIC INTERACTION WITH THE DOCUMENT OBJECT MODEL

BACKGROUND OF THE INVENTION

Typically, a web browser needs to receive the dependent resources associated with different links and URLs before it can complete the rendering of a webpage. The startup wait time experienced by an end-user of a browsing session may be insignificant in low-latency networks, such as wired Ethernet networks, but unacceptably long for an end-user in higher-latency networks, such as cellular 3G networks. Therefore, improved techniques for delivering information corresponding to a webpage would be desirable.

BRIEF DESCRIPTION OF THE DRAWINGS

Various embodiments of the invention are disclosed in the following detailed description and the accompanying drawings.

FIG. 2 is a diagram illustrating an embodiment of a webpage 200 described by an HTML file.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
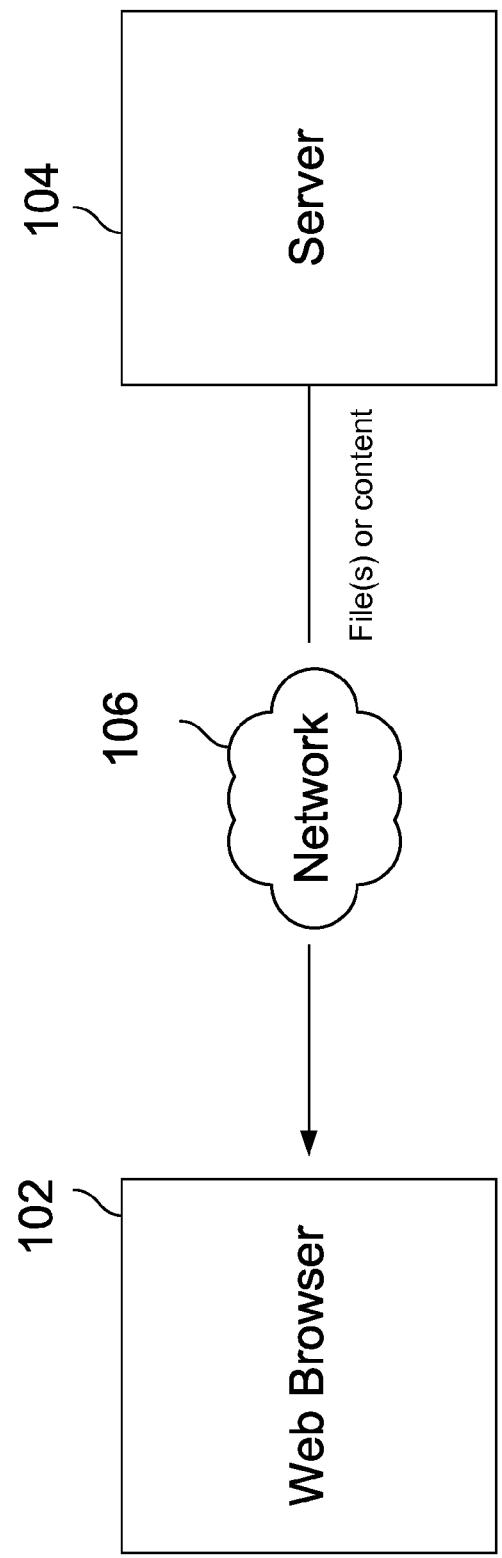
FIG. 1 is a block diagram illustrating an embodiment of a web browser accessing webpages and other information through a network.

FIG. 1 is a block diagram illustrating an embodiment of a web browser accessing webpages and other information through a network. As shown in FIG. 1, a web browser 102 is connected to a server 104 (e.g., an edge server) through a network 106. Network 106 may be any combination of public or private networks, including intranets, local area networks (LANs), wide area networks (WANs), radio access networks (RANs), Wi-Fi networks, the Internet, and the like. Web browser 102 may run on different types of devices, including laptop computers, desktop computers, tablet computers, smartphones, and other mobile devices.

A webpage accessed by web browser 102 may be described by different markup languages, including Hypertext Markup Language (HTML), Extensible Markup Language (XML), and the like. The webpage may also be described by different scripting languages, including JavaScript Object Notation (JSON), and the like. The webpage may be described by other custom languages as well. HTML is used hereinafter as an example of the various languages for describing webpages. Note that the examples of HTML are selected for illustration purposes only; accordingly, the present application is not limited to these specific examples.

FIG. 2 is a diagram illustrating an embodiment of a webpage 200 described by an HTML file. To display the webpage, web browser 102 sends a Hypertext Transfer Protocol (HTTP) request message to server 104 requesting the HTML webpage file. After server 104 locates the requested HTML webpage file, server 104 returns the requested HTML webpage file in an HTTP response message to web browser 102. As web browser 102 begins to render the webpage on a screen, web browser 102 parses the received webpage file and builds a data structure to represent the various components of the webpage in a local memory.

The Document Object Model (DOM) is a standardized model supported by different web browsers, e.g., Internet Explorer, Firefox, and Google Chrome, to represent the various components of a webpage. The DOM is a cross-platform and language-independent convention for representing and interacting with objects in HTML documents, as well as XHTML and XML documents. Objects in a DOM tree may be addressed and manipulated using methods on the objects. The public interface of a DOM is specified in its application programming interfaces (APIs).

The DOM standard includes different levels. DOM core level 0 and level 1 are the core standards supported by all web browsers, while DOM levels 2 and above are extensions to DOM core level 0 and level 1, which can be optionally supported by different web browsers. DOM core level 0 and level 1 define a minimal set of objects and interfaces for accessing and manipulating document objects. It provides a complete model for an entire HTML document, including the means to change any portion of the document.

The DOM standard represents documents as a hierarchy of node objects, called a DOM tree. Some types of nodes may have child nodes of various types, and others are leaf nodes that cannot have any object below them in the document structure hierarchy.

Figure 3:
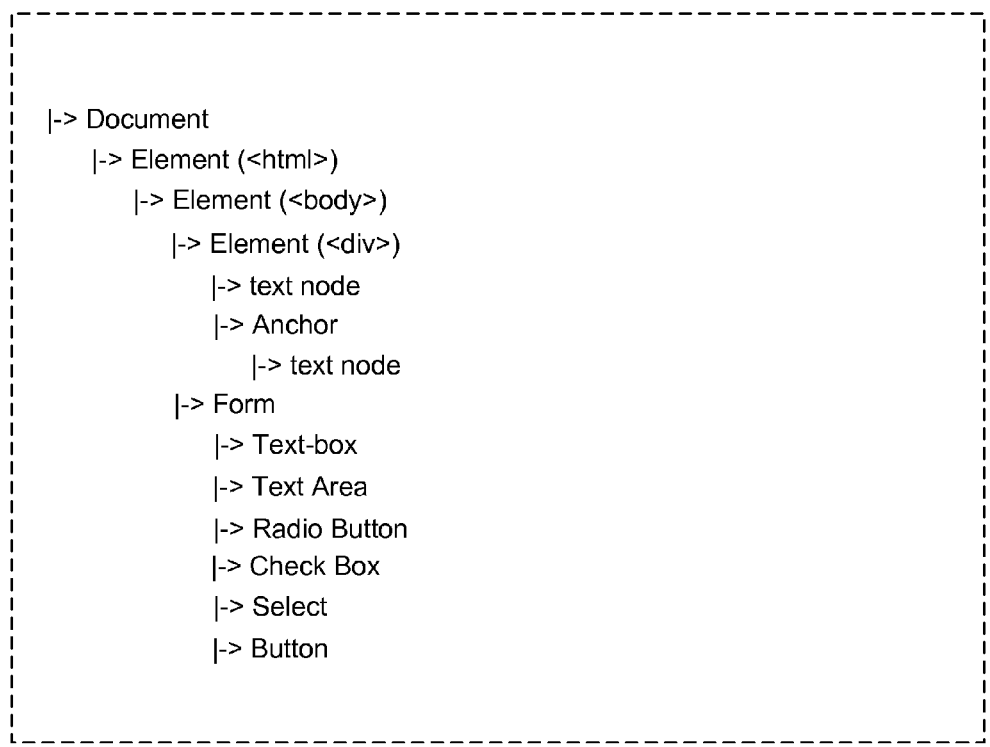
FIG. 3 is a diagram illustrating an embodiment of a DOM tree 300.

FIG. 3 is a diagram illustrating an embodiment of a DOM tree 300. As shown in FIG. 3, the topmost node, or root, of DOM tree 300 is the document object. A document object represents an entire HTML (or XML) document, and it provides the primary access to the document's data. The element object represents an element in the HTML document. Other types of nodes in the DOM tree may include text nodes, anchors, text-boxes, text areas, radio buttons, check boxes, selects, buttons, and the like.

With continued reference to FIG. 2, when web browser 102 renders webpage 200 on a screen, web browser 102 parses the received HTML webpage file and builds a DOM tree to represent the various components of webpage 200 in a local memory. For example, when the image tag (shown as <img src="url for image"/> in FIG. 2) is parsed by web browser 102, the image is represented as an image object, and the image object is inserted into the DOM tree accordingly.

After the webpage file is parsed and the corresponding DOM tree is created, the entire DOM tree can be traversed to retrieve any dependent resources (e.g., images, audio clips, or videos) indicated by any of the nodes in the DOM tree via a network. For example, the image object corresponding to the image tag in webpage 200 redirects web browser 102 to fetch an image file from an uniform resource locator (URL). Accordingly, web browser 102 sends a request via a network, requesting the image resource to be downloaded. There are two ways a request may be issued: statically, in which case it is the browser which manipulates the DOM; or dynamically, in which case the DOM manipulation is done by Javascript. In response to the request, the requested dependent resource is sent to web browser 102 via a network.

For example, if the nodes of the DOM tree include N different links and/or URLs, N separate GET requests (e.g., N separate HTTP GET requests) are sent via a network requesting the dependent resources to be sent to web browser 102. In response, N separate GET responses (e.g., N separate HTTP GET responses) are sent to web browser 102, delivering the dependent resources to web browser 102.

The round trip time or network response time for a GET request to arrive at an edge server and for its corresponding GET response to arrive at web browser 102 is dependent on the latency of the network, which is different for different types of networks. The network may be any combination of different types of public or private networks, including intranets, local area networks (LANs), wide area networks (WANs), radio access networks (RANs), Wi-Fi networks, the Internet, and the like. Therefore, the latency associated with the network may vary depending on its network type(s).

Some networks have relatively lower network latency. For example, the network latency associated with WANs or Wi-Fi networks is relatively low, e.g., on the order of 10 milliseconds. Suppose the number of links and/or URLs included in the DOM tree, N, is equal to twenty. The total network latency associated with receiving the dependent resources associated with the twenty links and/or URLs from the edge server, then, is approximately 200 milliseconds. To improve network performance, present day browsers have become more efficient in reusing connections to the same server, such that typically less than 20% of the connections may be fresh connections.

Some networks have relatively higher network latency. For example, the network latency associated with a $3^{rd}$ generation mobile telecommunications (3G) network, is relatively high, e.g., on the order of 100 milliseconds. In this instance, the total network latency associated with receiving the dependent resources associated with the twenty links and/or URLs from the edge server is then on the order of 2 seconds.

Since the network latency associated with different types of networks varies widely, and web browser 102 needs to receive the dependent resources associated with the links and URLs before web browser 102 can complete the rendering of webpage 200, the startup wait time experienced by the end-user of the browsing session may be insignificant in low-latency networks, such as Wi-Fi networks, but unacceptably long for an end-user in higher-latency networks, such as 3G networks. Therefore, improved techniques for delivering information corresponding to a webpage would be desirable.

Figure 4:
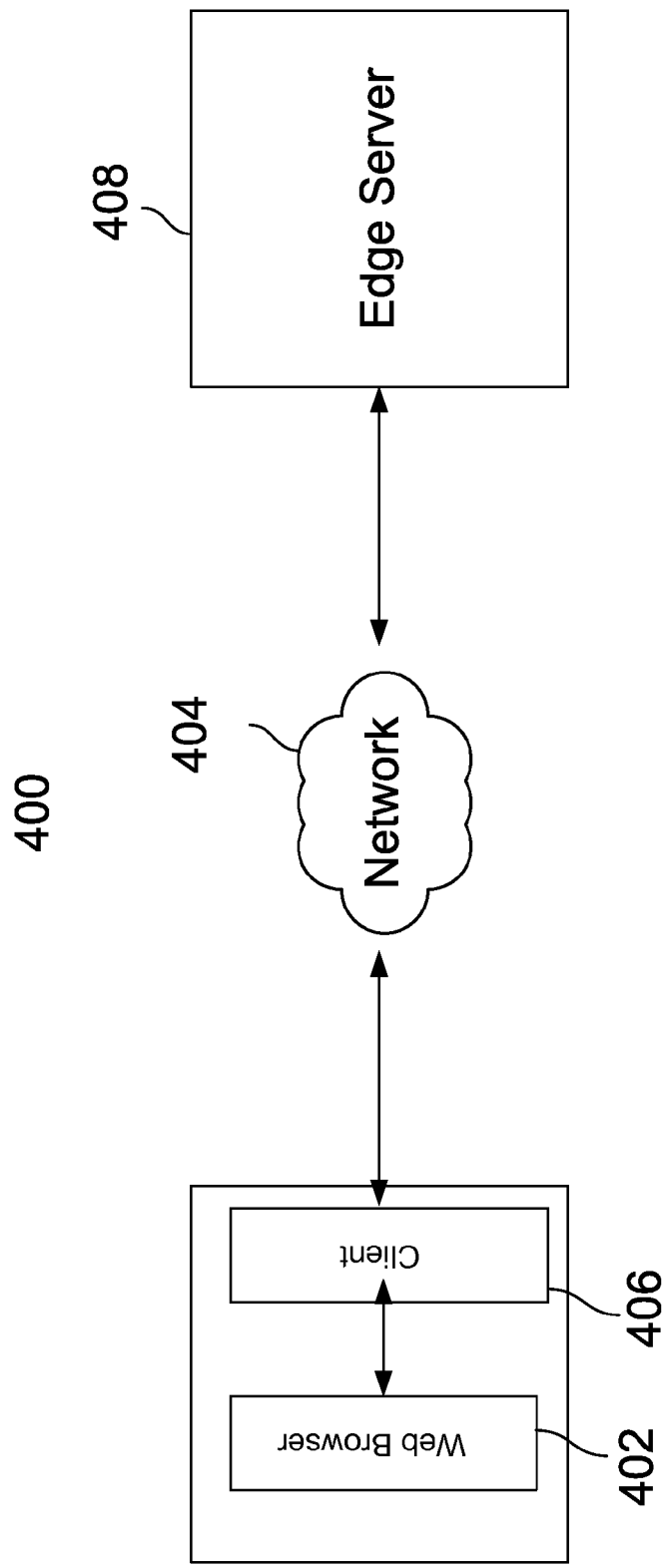
FIG. 4 is a block diagram illustrating an embodiment of a client-server system 400 for virtualizing a DOM of a web browser.

FIG. 4 is a block diagram illustrating an embodiment of a client-server system 400 for virtualizing a DOM of a web browser. Virtualization of a DOM of a web browser allows the client-server system to take control of the DOM for different kinds of optimizations, while keeping the virtualization transparent to the web browser. A web browser 402 accesses webpages and other information through a network 404. When web browser 402 sends any network messages onto network 404 that are related to the downloading of webpages or other information, the messages may be either intercepted and processed by a client 406, or directly received and then processed by an edge server 408 supporting virtualization. Webpages or other information related to the webpages that are sent to web browser 402 may be intercepted, filtered, processed, or provided by client 406 or edge server 408. In addition, method API calls by web browser 402 or any JavaScript code to manipulate the objects in a DOM tree may be intercepted, processed, or modified by client 406. Client 406 may also manipulate the DOM tree by making the appropriate method API calls to the DOM tree. As a result, client 406 and edge server 408 together create a virtualization engine for the DOM of web browser 402. The virtualization engine may access and manipulate a DOM tree, including the creation, deletion, or update of nodes within the DOM tree.

Virtualization of the DOM of web browser 402 may be applicable to different types of optimization. In some embodiments, using the virtualization engine, optimized delivery of information over a network by segmentation and reprioritization of downloaded information can be achieved. For example, using the virtualization engine, the delivery of the information (e.g., the order in which the information is delivered or the granularity of the information delivered) and the actual content of the delivered information corresponding to any nodes of the DOM tree may be altered, thereby speeding up the rendering of a webpage, without compromising the end-user's experience.

In some embodiments, the virtualization of the DOM of web browser 402 is transparent to web browser 402. In some embodiments, the virtualization of the DOM of web browser 402 is also transparent to the end-users. The end-users are not required to install any plugins. In some embodiments, the virtualization of the DOM of web browser 402 is also transparent to the content publishers, without requiring the content publishers to change any codes. In some embodiments, client 406 may be injected into web browser 402 based on standards-based (e.g., HTML or JavaScript) procedures. For example, after edge server 408 receives a request from web browser 402 requesting an HTML webpage file, server 408 may parse the HTML webpage file, inject client 406 into the HTML webpage file, and then send the response back to web browser 402. In some embodiments, client 406 may be injected by adding JavaScript client code in the head section of the HTML webpage file.

Virtualization of the DOM of web browser 402 includes handling static and dynamic interactions with the DOM of web browser 402. Both types of interactions may be intercepted or virtualized by the virtualization engine.

Dynamic interactions with the DOM of web browser 402 include interactions that are effected by JavaScripts (e.g., Ajax). The DOM of web browser 402 is virtualized by having client 406 intercept and virtualize method API calls to create, delete, or update elements in the DOM. In some embodiments, only DOM core level 1 APIs, which are supported by all standardized web browsers, are intercepted and virtualized. The DOM core level 1 APIs for manipulating the DOM tree are supplanted by the equivalent JavaScript interfaces of the virtualization engine.

Static interactions to the DOM of web browser 402 include interactions corresponding to static HTML tags in an HTML webpage file (e.g., the <img src="url for image"/> tag as shown in FIG. 2). An HTML tag redirects web browser 402 to fetch a dependent resource (e.g., an image file) from an URL. Because the static GET request is not made via a JavaScript, the static request is not intercepted by client 406. Instead, the static request is sent by web browser 402 in its native form and then routed over the network, e.g., by means of DNS resolution, to an edge server 408 supporting virtualization.

In some embodiments, edge server 408 may discern whether a GET request is sent by web browser 402 or client 406 using a signature-based scheme, thus enabling edge server 408 to handle the static case as mentioned above. For example, if a GET request was sent by client 406, the GET request would be stamped with a predetermined signature. Conversely, if the GET request was sent directly from web browser 402, as in the static case, the GET request would not be stamped with the predetermined signature.

In some embodiments, when a GET request is sent directly from web browser 402 in a static case, edge server 408 may send dummy content in response, causing web browser 402 to create a dummy node in the DOM tree. At the same time, edge server 408 may also notify client 406, e.g., by sending a JavaScript, that a dummy node has just been created in the DOM tree, thereby eliminating the need for client 406 to poll the DOM tree for any new dummy nodes added to the DOM tree. Client 406, being notified of the newly created dummy node in the DOM tree, may dynamically update the dummy node with the actual content by issuing one or more JavaScript requests to edge server 408. In response to the one or more requests, edge server 408 sends one or more JavaScript updates, which are then intercepted by client 406, which may then populate the dummy node with the actual image content.

Using the virtualization engine, optimized delivery of information over a network by segmentation and reprioritization of downloaded information can be achieved. Note that the delivery of different information to web browser 402 may be determined by the type of the information. For example, dependent resources such as images, audio clips, and videos may be delivered using different techniques that are optimized based on the type of resource. In some embodiments, the virtualization engine may selectively alter or modify the delivery of only certain types of information (e.g., images). Images are used hereinafter as an example of the various dependent resources that can be efficiently downloaded to web browser 402 by the virtualization engine. Note that the examples of downloading images are selected for illustration purposes only; accordingly, the present application is not limited to these specific examples only.

In some other techniques, a compressed image is encoded in a format such that the image file is divided into a series of scans. The first scan shows the image at a lower quality, and the following scans gradually improve the image quality. For example, an image in progressive JPEG format is compressed in multiple passes of progressively higher detail. The initial passes include lower frequency components of the image, while the subsequent passes include higher frequency components of the image. Rendering an image in progressive JPEG format shows a reasonable preview of the image after a first pass of rendering of the lower frequency components of the image, with the image progressively turning sharper with higher detail after subsequent passes. A web browser can begin displaying an image encoded in progressive JPEG format as it is being downloaded from the network, by rendering each successive pass of the image as it is downloaded and received. Doing so improves on the startup time experienced by the end-user. Nonetheless, upon a GET for an image, the entirety of the image is downloaded. In some instances, components of the webpage other than the image may have higher priority than the details of the progressively encoded image contained in the subsequent passes, and it would be advantageous to download these important components of the web page before the whole image. In some instances, it is preferable to deploy the bandwidth used to download the whole image to instead download other important components of the webpage. However, such prioritization of webpage content is lost when the image is treated as a single binary content.

Therefore, in some embodiments, the startup wait time can be reduced by dividing a progressive JPEG image file (or other image files that are compressed in multiple passes of progressively higher detail) into a plurality of segments based on priorities, e.g., frequency. Having control of both ends of the communication in a client and server system, the lower frequency components of the image can be requested by client 406 and sent by edge server 408 first, and then the higher frequency components can be requested by client 406 and sent by server 408 dynamically to refresh and sharpen the image.

Since a webpage may include content retrieved by multiple GET requests, by dividing each GET request into a plurality of GET requests, the server transmit queue is reprioritized to transmit (and web browser 402 is reprioritized to render) the higher priority components of each of the GETs first. In particular, if one original GET request corresponds to a huge image, the impact of the huge image blocking all the other GET requests would be lessened. As a result, the latency of seeing the images from the other GET requests is reduced.

In some embodiments, the segment sizes (e.g., the percentages of the original image file) delivered to web browser 402 in response to the plurality of GET requests may be tuned dynamically based on network load, network bandwidth, or other specifics of a user's connection. For example, the size of the first segment may be only 10% of the total image on a high latency and low bandwidth connection, while the size of the first segment may be 90% of the total image on a low latency and high bandwidth connection.

Figure 5:
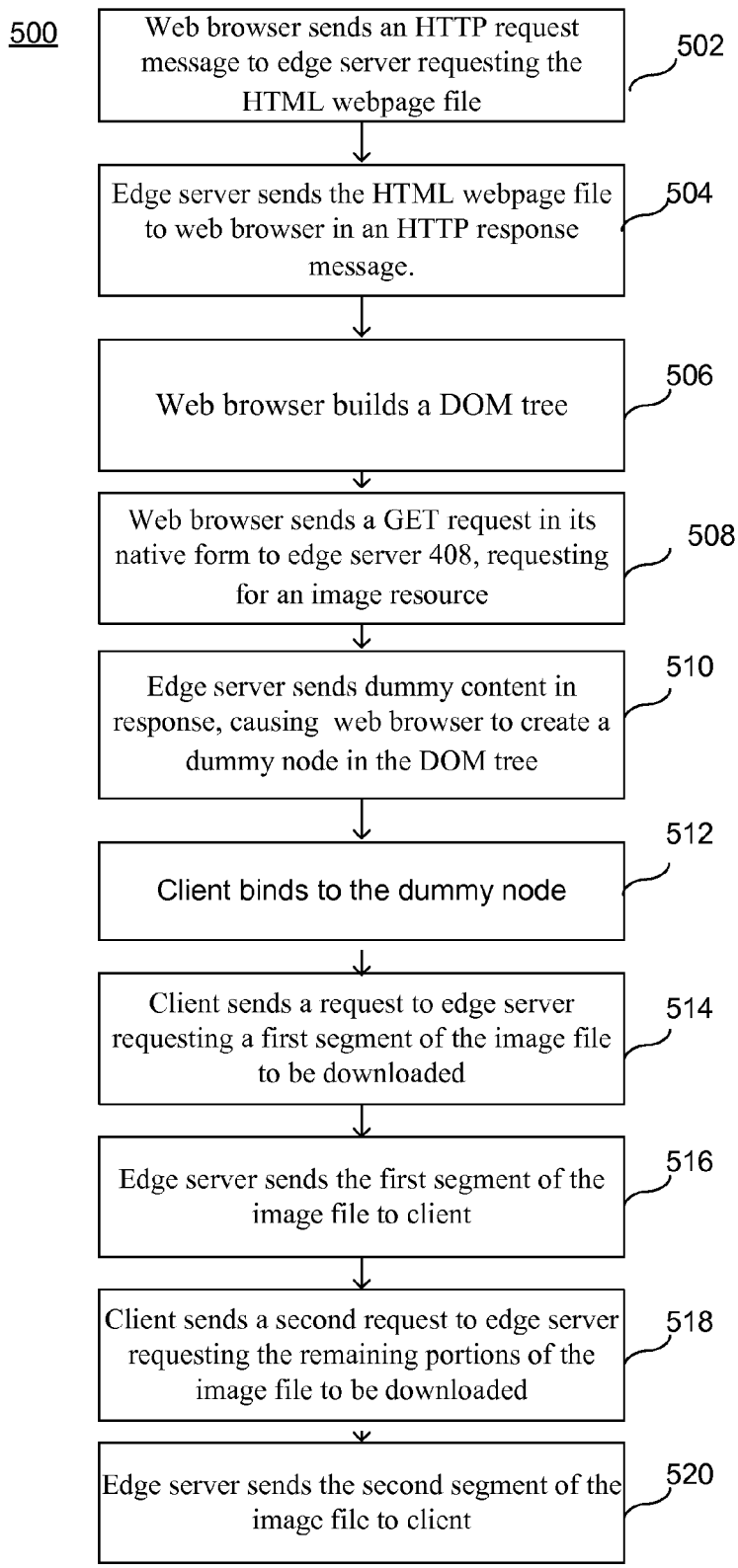
FIG. 5 is a diagram illustrating an embodiment of a flow diagram 500 for optimized delivery of an image resource associated with a webpage.

FIG. 5 is a diagram illustrating an embodiment of a flow diagram 500 for optimized delivery of an image resource associated with a webpage. Flow diagram 500 provides an example for the static case disclosed above. The steps shown in flow diagram 500 are performed on web browser 402, client 406, and edge server 408.

With reference to FIG. 5, at 502, to display a webpage (e.g., webpage 200 as shown in FIG. 2), web browser 402 sends an HTTP request message to edge server 408 requesting the HTML webpage file corresponding to the webpage. After edge server 408 locates the requested HTML webpage file, edge server 408 parses the HTML webpage file, injects client 406 into the HTML webpage file, and then sends the HTML webpage file to web browser 402 in an HTTP response message at 504. Client 404 is then up and running.

At 506, web browser 402 parses the HTML webpage file and builds a DOM tree to represent the various components of webpage 200 in a local memory. For example, when the image tag (shown as <img src="url for image"/> in FIG. 2) is parsed by web browser 402, the image is represented as an image object, and the image object is inserted into the DOM tree accordingly.

After the DOM tree is created, the DOM tree is traversed to retrieve any dependent resources indicated by any of the nodes in the DOM tree via a network. For example, the image object corresponding to the static image tag in webpage 200 redirects web browser 402 to fetch an image file from an URL. At 508, web browser 402 sends a GET request in its native form to edge server 408. Since the GET request is sent directly from web browser 402, the GET request is not stamped with any signature.

At 510, edge server 408 sends dummy content in response, causing web browser 402 to create a dummy node in the DOM tree. Edge server 408 also notifies client 406 that a dummy node corresponding to the image resource has just been created in the DOM tree. At 512, client 406 binds to the dummy node.

At 514, client 406 sends a request to edge server 408 requesting a first segment of the image file to be downloaded. Note that the underlying communication protocol utilized between client 406 and edge server 408 can be any one of many protocols, including proprietary protocols or standards-based protocols such as HTTP. In some embodiments, the request message sent by client 406 may include different information, including the URL of the dependent resource, the dimensions of the image, and the like. In some embodiments, the request message may also include an indication of how the image should be segmented. For example, the request message may specify a percentage (e.g., 70%) of the total size of the image to be downloaded. In some embodiments, edge server 408 determines a percentage of the total size of the image to be downloaded based on network conditions and the like.

At 516, edge server 408 sends the first segment of the image file to client 406. For example, the first segment may be the first scan of a progressive JPEG image, containing the lower frequency components of a progressive JPEG image. Client 406 then uses method API calls to refresh the dummy node in the DOM tree with the received image file, and the initial lower quality image can be rendered on the screen.

At 518, client 406 sends another request to edge server 408, requesting the remaining portions of the image file to be downloaded. At 520, edge server 408 sends the remaining portions (e.g., the remaining 30%) of the image file to client 406. For example, the second segment may be the second scan of a progressive JPEG image, containing the higher frequency components of the progressive JPEG image. Client 406 then uses method API calls to refresh the image node in the DOM tree with the received image file, and a sharper and higher quality image can be rendered on the screen.

In some embodiments, the refreshing of the image node can be reprioritized based on user actions, user profiles, the statistical behavior of many users in accessing CDN content, or other network profiles.

In some embodiments, the refreshing of the image node can be reprioritized based on user actions. During a browsing session, a user may scroll to the bottom of a webpage before the webpage is loaded to completion. A user may also expand or minimize certain portions of the webpage. These and other user actions can be used to reprioritize the refreshing of the nodes in the DOM tree. For example, if it is detected that the user has scrolled to the bottom of a webpage, then client 406 may delay or disable the refreshing of an image node corresponding to an image that is no longer in the display zone.

In some embodiments, the refreshing of the image node can be reprioritized based on CDN content access statistics.

For example, statistics may indicate that very few users choose to look at images on the bottom left corner of the webpage. In this case, client 406 may delay or disable the refreshing of the image nodes corresponding to those images.

Figure 6:
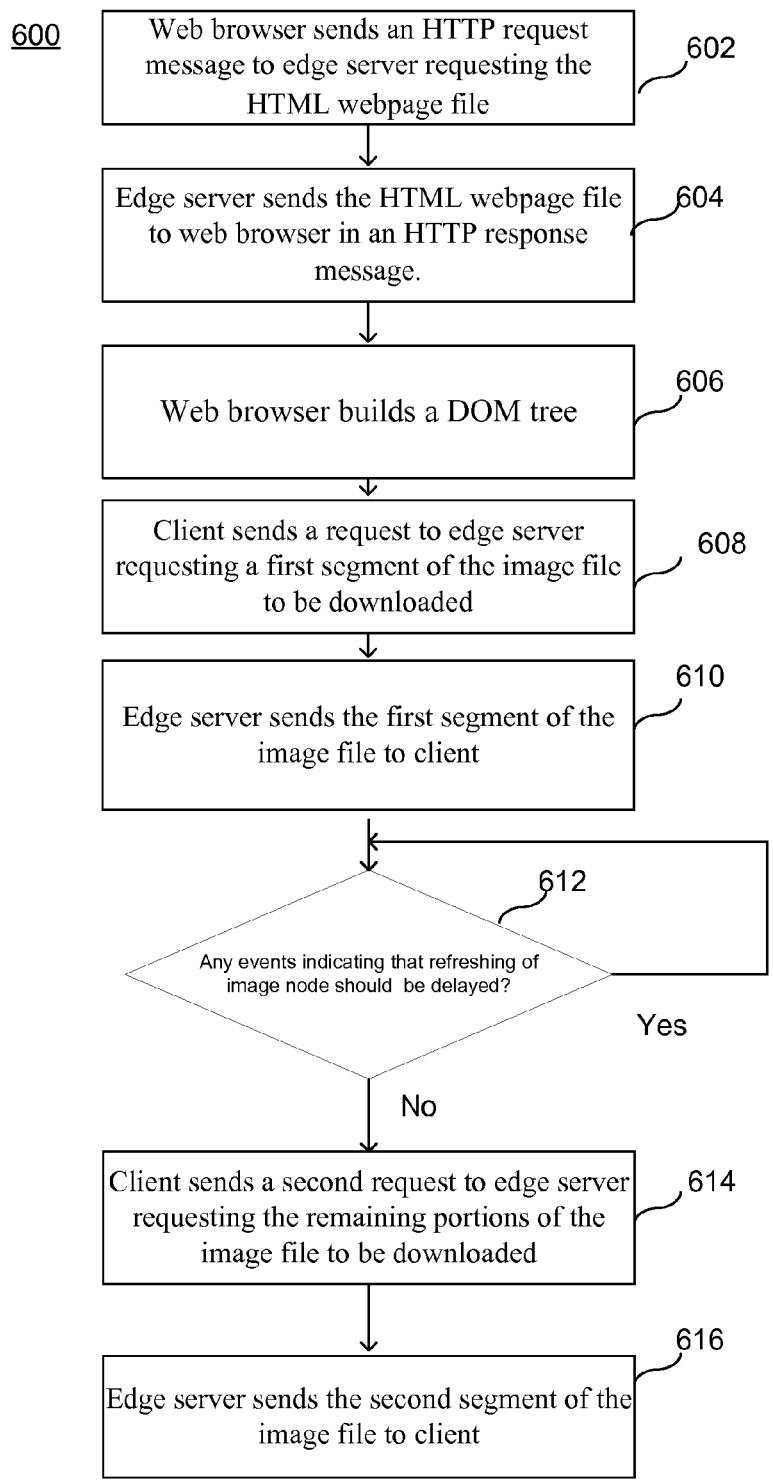
FIG. 6 is a diagram illustrating an embodiment of a flow diagram 600 for optimized delivery of an image resource associated with a webpage.

FIG. 6 is a diagram illustrating an embodiment of a flow diagram 600 for optimized delivery of an image resource associated with a webpage. Flow diagram 600 provides an example for the dynamic case disclosed earlier. The steps shown in flow diagram 600 are performed on web browser 402, client 406, and edge server 408.

With reference to FIG. 6, at 602, to display a webpage (e.g., webpage 200, as shown in FIG. 2), web browser 402 sends an HTTP request message to edge server 408 requesting the HTML webpage file corresponding to the webpage. After edge server 408 locates the requested HTML webpage file, edge server 408 parses the HTML webpage file, injects client 406 into the HTML webpage file, and then sends the HTML webpage file to web browser 402 in an HTTP response message at 604. Client 404 is then up and running.

At 606, web browser 402 parses the HTML webpage file and builds a DOM tree to represent the various components of webpage 200 in a local memory. When the script tag (as shown in FIG. 2) is parsed by web browser 402, a JavaScript is executed. If the JavaScript creates an image node, then the corresponding DOM core level 1 method API call(s) are intercepted by client 406 as part of the virtualization of the DOM, enabling client 406 to control the delivery of the content related to the node.

At 608, client 406 sends a request to edge server 408 requesting a first segment of the image file to be downloaded. Note that the underlying communication protocol utilized between client 406 and edge server 408 can be any one of many protocols, including proprietary protocols or standards-based protocols such as HTTP. In some embodiments, the request message sent by client 406 may include different information, including the URL of the image resource, the height and width of the image, and the like. In some embodiments, the request message may also include an indication of how the image should be segmented. For example, the request message may specify a percentage (e.g., 70%) of the total size of the image to be downloaded. In some embodiments, edge server 408 determines a percentage of the total size of the image to be downloaded based on network conditions, and the like.

At 610, edge server 408 sends the first segment of the image file to client 406. For example, the first segment may be the first scan of a progressive JPEG image, including the lower frequency components of a progressive JPEG image. Client 406 then uses method API calls to refresh the image node in the DOM tree with the received image file, and the initial lower quality image can be rendered on the screen.

At 612, client 406 determines whether there are any events indicating that refreshing of the image node should be delayed or disabled. For example, the events checked by client 406 may be any event related to user actions, user profiles, statistical behavior of many users in accessing CDN content, or other network profiles as disclosed above.

If events are not detected, then client 406 sends another request to edge server 408, requesting the remaining portions of the image file to be downloaded, at 614. At 616, edge server 408 sends the remaining portions (e.g., the remaining 30%) of the image file to client 406. For example, the second segment may be the second scan of a progressive JPEG image, including the higher frequency components of the progressive JPEG image. Client 406 then uses method API calls to refresh the image node in the DOM tree with the received image file, and a sharper and higher quality image can be rendered on the screen.

In some embodiments, client 406 may combine more than one GET requests into a single GET request before sending to edge server 408, thereby reducing the overall round trip delays. In some embodiments, server 408 may convert an image from one format to another format (e.g., from PNG to JPG plus an alpha channel) before sending the image to client 406 for faster delivery through the network. Client 406 can convert the image back to the original format before the image is rendered on the screen.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of updating a document object model (DOM), comprising the steps of:
    intercepting an original request by a web browser to update the DOM- and supplanting the original request by the web browser to update the DOM by a modified request to update the DOM, wherein the original request would have caused downloading of a set of information from a server to update the DOM had the original request not been intercepted and supplanted;
    forming a request to the server based on the original request, wherein the request to the server requests downloading of a portion of the set of information but not all of the set of information from the server, wherein segmenting the set of information into the portion of the set of information and an at least an additional portion of the set of information is based at least in part on a network condition, and wherein the set of information comprises an image, and wherein the portion of the set of information comprises lower frequency components of the image, and wherein the at least an additional portion of the set of information comprises higher frequency components of the image, and wherein the portion of the set of information comprises a first scan of a progressive JPEG image, and wherein the at least an additional portion of the set of information comprises a subsequent scan of the progressive JPEG image;
    sending the request to the server;
    receiving a first response to the request, wherein the first response to the request includes the portion of the set of information from the server;
    processing the first response to determine a first update to the DOM; and
    applying the first update to the DOM.

2. The method of claim 1, wherein the steps are performed by a client, and wherein the client communicates with the server in a client-server protocol.

3. The method of claim 2, wherein the client is transparent to the web browser.

4. The method of claim 2, wherein the client is injected by adding JavaScript client code in a head section of a webpage file.

5. The method of claim 1, wherein the set of information comprises a dependent resource.

6. The method of claim 5, wherein the dependent resource comprises an image.

7. The method of claim 1, wherein the set of information is specified by a uniform resource locator (URL).

8. The method of claim 1, wherein the forming of the request to the server is based at least in part on a type of the set of information.

9. The method of claim 1, wherein the first response to the request is based at least in part on a type of the set of information.

10. The method of claim 1, wherein the intercepting of the original request is selectively performed based at least in part on a type of the set of information.

11. The method of claim 1, wherein intercepting the original request by the web browser to update the DOM comprises:
    intercepting a DOM application programming interface (API) call made by a JavaScript, wherein the JavaScript is a portion of a webpage.

12. The method of claim 11, wherein the DOM API call comprises a DOM core level 1 API call.

13. The method of claim 11, wherein the DOM API call is supplanted by another DOM API call by a client performing the steps, and wherein the modified request to update the DOM comprises the another DOM API call.

14. The method of claim 1, further comprising:
    sending a subsequent request to the server, requesting at least an additional portion of the set of information from the server;
    receiving a second response including the at least an additional portion of the set of information from the server;
    processing the second response to determine a second update to the DOM; and
    applying the second update to the DOM.

15. The method of claim 14, further comprising:
    segmenting the set of information into the portion of the set of information and the at least an additional portion of the set of information based at least in part on priorities of different portions of the information.

16. The method of claim 14, wherein the sending of the subsequent request is delayed based at least in part on a user action.

17. The method of claim 16, wherein the user action comprises a user scrolling to a portion of a webpage not requiring the set of information.

18. The method of claim 14, wherein the sending of the subsequent request is delayed based on statistical behavior of users.

19. The method of claim 1, further comprising:
    intercepting another original request by the web browser to update the DOM, wherein the another original request would have caused downloading of another set of information from the server to update the DOM had the another original request not been intercepted; and
    using the request to the server to request a portion of the another set of information from the server.

20. The method of claim 1, wherein the downloading of the set of information would have been in a first format had the original request not been intercepted and supplanted, and wherein the downloading of the portion of the set of information from the server is in a second format, and wherein the first format and the second format are different.

21. A system for updating a document object model (DOM), comprising:
    a processor configured to:
        receive a request from a client, wherein the request is formed by the client based on an original request by a web browser to update the DOM, and wherein the original request to update the DOM is intercepted by the client, and wherein the original request to update the DOM is supplanted by a modified request to update the DOM by the client, and wherein the original request would have caused downloading of a set of information from the system to update the DOM had the original request not been intercepted and supplanted by the client, and wherein the request requests downloading of a portion of the set of information but not all of the set of information to the client, wherein segmenting the set of information into the portion of the set of information and an at least an additional portion of the set of information is based at least in part on a network condition, and wherein the set of information comprises an image, and wherein the portion of the set of information comprises lower frequency components of the image, and wherein the at least an additional portion of the set of information comprises higher frequency components of the image, and wherein the portion of the set of information comprises a first scan of a progressive JPEG image, and wherein the at least an additional portion of the set of information comprises a subsequent scan of the progressive JPEG image; and send a first response to the request to the client, wherein the first response includes the portion of the set of information, wherein the first response is processed by the client to determine a first update to the DOM, and wherein the first update is applied to the DOM by the client; and a memory coupled to the processor and configured to provide the processor with instructions.

22. The system of claim 21, wherein the client is transparent to the web browser.

23. The system of claim 21, wherein the client is injected by adding JavaScript client code in a head section of a webpage file.

24. The system of claim 21, wherein the set of information comprises a dependent resource.

25. The system of claim 24, wherein the dependent resource comprises an image.

26. The system of claim 21, wherein the set of information is specified by a uniform resource locator (URL).

27. The system of claim 21, wherein the forming of the request by the client is based at least in part on a type of the set of information.

28. The system of claim 21, wherein the first response to the request is based at least in part on a type of the set of information.

29. The system of claim 21, wherein the interception of the original request by the client is selectively performed based at least in part on a type of the set of information.

30. The system of claim 21, wherein the intercepting of the original request by the web browser to update the DOM by the client comprises:

intercepting by the client a DOM application programming interface (API) call made by a JavaScript, wherein the JavaScript is a portion of a webpage.

31. The system of claim 30, wherein the DOM API call comprises a DOM core level 1 API call.

32. The system of claim 30, wherein the DOM API call is supplanted by another DOM API call by the client, and wherein the modified request to update the DOM comprises the another DOM API call.

33. The system of claim 21, wherein the processor is further configured to:

receive a subsequent request from the client, wherein the subsequent request requests at least an additional portion of the set of information to be sent to the client; and send a second response including the at least an additional portion of the set of information to the client, wherein the second response is processed by the client to determine a second update to the DOM, and wherein the second update is applied to the DOM by the client.

34. The system of claim 33, wherein the processor is further configured to:

segment the set of information into the portion of the set of information and the at least an additional portion of the set of information based at least in part on priorities of different portions of the information.

35. The system of claim 33, wherein the sending of the subsequent request by the client is delayed based at least in part on a user action.

36. The system of claim 35, wherein the user action comprises a user scrolling to a portion of a webpage not requiring the set of information.

37. The system of claim 33, wherein the sending of the subsequent request by the client is delayed based on statistical behavior of users.

38. The system of claim 21, wherein another original request by the web browser to update the DOM is intercepted by the client, wherein the another original request would have caused downloading of another set of information to update the DOM had the another original request not been intercepted, and wherein the request is used to request a portion of the another set of information.

39. The system of claim 21, wherein the downloading of the set of information would have been in a first format had the original request not been intercepted and supplanted, and wherein the downloading of the portion of the set of information from the server is in a second format, and wherein the first format and the second format are different.

40. A computer program product for updating a document object model (DOM), the computer program product being embodied in a non-transitory tangible computer readable storage medium and comprising computer instructions for:

receiving a request from a client, wherein the request is formed by the client based on an original request by a web browser to update the DOM, and wherein the original request to update the DOM is intercepted by the client, and wherein the original request to update the DOM is supplanted by a modified request to update the DOM by the client, and wherein the original request would have caused downloading of a set of information to update the DOM had the original request not be intercepted and supplanted by the client, and wherein the request requests downloading of a portion of the set of information but not all of the set of information to the client, wherein segmenting the set of information into the portion of the set of information and an at least an additional portion of the set of information is based at least in part on a network condition, and wherein the set of information comprises an image, and wherein the portion of the set of information comprises lower frequency components of the image, and wherein the at least an additional portion of the set of information comprises higher frequency components of the image, and wherein the portion of the set of information comprises a first scan of a progressive JPEG image, and wherein the at least an additional portion of the set of information comprises a subsequent scan of the progressive JPEG image; and sending a first response to the request to the client, wherein the first response includes the portion of the set of information, wherein the first response is processed by the client to determine a first update to the DOM, and wherein the first update is applied to the DOM by the client.

* * * * *